A. J. SMITH
PISTON RING.
APPLICATION FILED SEPT. 17, 1915.
1,181,618.
Patented May 2, 1916.
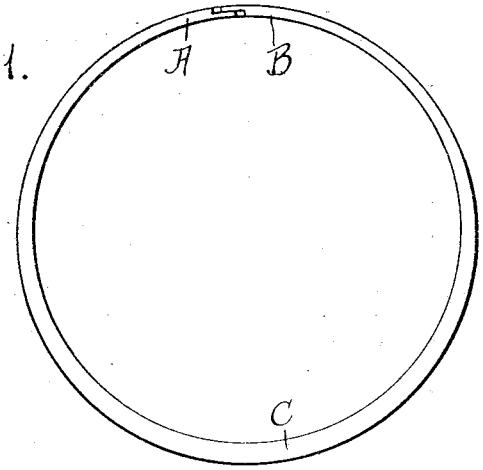
Fig. 1.
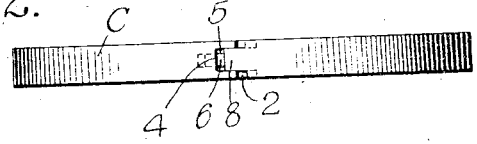
Fig. 2.
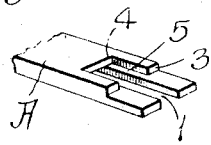
Fig. 4.
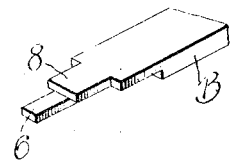
Fig. 6
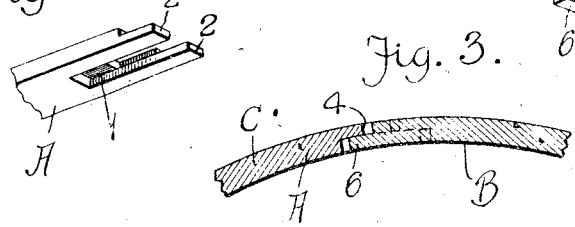
Fig. 5.
Fig. 3.
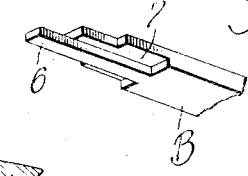
Fig. 7.
Inventor
Alba J. Smith,
Witnesses
Chas. W. Stauffiger
Karl H. Butler
By
Attorneys

UNITED STATES PATENT OFFICE.

ALBA J. SMITH, OF DETROIT, MICHIGAN.

PISTON-RING.

1,181,618. Specification of Letters Patent. Patented May 2, 1916.

Application filed September 17, 1915. Serial No. 51,124.

*To all whom it may concern:*

Be it known that I, ALBA J. SMITH, a citizen of the United States of America, residing at Detroit, in the county of Wayne and State of Michigan, have invented certain new and useful Improvements in Piston-Rings, of which the following is a specification, reference being had therein to the accompanying drawings.

A motor constantly fed with an ideal mixture, timed for the smoothest pressure impulses, well lubricated, fitted with most desirable anti-friction bearings, and having very clean cut valve action may be still woefully deficient in power, extravagant in fuel and oil and subject to annoying operating troubles and excessive maintenance expense if the piston rings fail to perform their function properly. Piston rings that score or wear cylinders; that are capable of lateral expansion; that have gaps to open or leak, and that overheat and pump oil are objectionable and cause no end of piston trouble wherever tightness and a minimum friction are required between piston and cylinder walls.

The piston ring which I have devised is applicable to all piston grooves of any motor and perfect cylinder contact is assured by equal expansion of the whole ring against all points of the cylinder. Such a ring is free from all the defects above enumerated and possesses wearing qualifications essential to the perfect performance of a motor.

The mechanical construction by which I attain the above and other results will be hereinafter specifically described and then claimed, and reference will now be had to the drawing, wherein—

Figure 1 is a side elevation of a piston ring in accordance with my invention; Fig. 2 is a plan of the same; Fig. 3 is a longitudinal sectional view of a portion of the ring; Fig. 4 is a perspective view of a portion of the ring showing an auxiliary groove; Fig. 5 is a similar view illustrating a main groove; Fig. 6 is a perspective view of a portion of the ring showing an auxiliary tongue; and Fig. 7 is a similar view illustrating a main tongue.

In the drawing, C denotes a ring or band having interlocked and self adjusting ends and it is in the construction of these ends that my invention resides. The manner in which the ends of the ring interlock is shown in Figs. 2 and 3 and a detail construction of each end is shown in Figs. 4 to 7 inclusive. First referring to that end generally designated A, the inner side of the ring is provided with a longitudinal main groove 1 forming parallel arms 2. The outer side of the ring is cut away to form a recess 3 and an auxiliary groove 4, said groove being of less length than the main groove 1 and of greater width, thereby providing lateral shoulders 5. Considering now the end of the ring generally designated B in Figs. 6 and 7, the inner side of the ring has a main tongue 6 approximately the length of the main groove 1 and forming side recesses 7 which receive the arms 2 of the ring end A. The outer side of the ring has an auxiliary tongue 8 substantially the length and width of the auxiliary groove 4, said tongue being adapted to slide upon the shoulders 5 of the ring end A, with the base of the auxiliary tongue in the recess 3 of the ring end A.

The ring is made of resilient metal and when the ends A and B thereof are placed together, the main and auxiliary tongues fit within the main and auxiliary grooves and are capable of shifting therein without opening the connection between the ring ends to form a gap that would cause leakage. This is accomplished through the medium of the wide auxiliary tongue 8 bearing upon the shoulders 5 and by making the main tongue and groove of sufficient length to allow the ends of the ring to shift without producing an opening. The main and auxiliary tongues fitting within their respective grooves prevent lateral displacement of one end of the ring relative to the other end and while the ring may adjust itself and exert a uniform pressure throughout its length on the walls of the cylinder, yet there is no possibility of leakage at the ring ends.

A ring in accordance with my invention reduces carbon, stops overheating and pumping of oil and a consequent saving of cylinder oil. It also reduces all possible wearing friction and a cylinder having a piston provided with my improved ring is assured longevity and high efficiency.

What I claim is:—

A piston ring having interlocked ends A and B with the ring end A formed with a main groove providing parallel arms, the ring end B having a main tongue adapted for slidable engagement in the main groove with said arms at the sides thereof, the ring end A having an auxiliary groove of greater width and less length than the main groove, the ring end B having an auxiliary tongue to extend into the auxiliary groove and overlie the greater portion of said main groove, the ring end A having the outer side thereof recessed and the ring end B having the inner side recessed, whereby said main tongue may extend well under the ring end A and the arms thereof well under the ring end B with the outer and inner sides of the ring ends flush and held against vertical displacement relative to each other.

In testimony whereof I affix my signature in presence of two witnesses.

ALBA J. SMITH.

Witnesses:
ANNA M. DORR,
CHAS. W. STAUFFIGER.